United States Patent
Tung et al.

(10) Patent No.: US 8,641,215 B2
(45) Date of Patent: Feb. 4, 2014

(54) DISPLAY DEVICE WITH SWITCHABLE VIEWING ANGLE AND BACKLIGHT MODULE THEREOF

(75) Inventors: Chih-Kang Tung, Hsin-Chu (TW); Wen-Chieh Liu, Hsin-Chu (TW)

(73) Assignee: AU Optronics Corporation, Hsin-Chu (TW)

(*) Notice: Subject to any disclaimer, the term of this patent is extended or adjusted under 35 U.S.C. 154(b) by 349 days.

(21) Appl. No.: 13/105,093

(22) Filed: May 11, 2011

(65) Prior Publication Data
US 2012/0069550 A1   Mar. 22, 2012

(30) Foreign Application Priority Data
Sep. 17, 2010 (TW) ................ 99131714 A

(51) Int. Cl.
*G02F 1/1335* (2006.01)
(52) U.S. Cl.
USPC ........... 362/97.1; 362/610; 362/615; 362/620
(58) Field of Classification Search
USPC ............... 362/610, 615, 620, 623, 626, 97.1
See application file for complete search history.

(56) References Cited

U.S. PATENT DOCUMENTS

| | | | |
|---|---|---|---|
| 5,079,675 A | | 1/1992 | Nakayama |
| 5,420,761 A | | 5/1995 | DuNah et al. |
| 6,305,811 B1 | * | 10/2001 | Beeson et al. ............ 362/626 |
| 7,374,329 B2 | * | 5/2008 | Feng et al. ............... 362/626 |
| 7,564,517 B2 | * | 7/2009 | Daiku et al. .............. 349/62 |
| 8,052,316 B2 | * | 11/2011 | Lee ........................... 362/610 |

(Continued)

FOREIGN PATENT DOCUMENTS

| | | |
|---|---|---|
| JP | 2005141184 A | 6/2005 |
| TW | 200742911 | 11/2007 |
| TW | 200923505 | 6/2009 |

OTHER PUBLICATIONS

English translation of abstract of TW 200742911.

(Continued)

*Primary Examiner* — Anabel Ton
(74) *Attorney, Agent, or Firm* — McClure, Qualey & Rodack, LLP

(57) ABSTRACT

A display device with switchable viewing includes a backlight module and a display panel. The backlight module includes a light guide plate, first optical structures, a reflector, a first light source, and a second light source. The light guide plate includes a bottom surface, a light exit surface, a first light incident surface, and a second light incident surface. The display panel is disposed on the light exit surface. The first optical structures are disposed on the bottom surface and each includes a first inclined surface and a second inclined surface. The angle between the first inclined surface and the bottom surface is smaller than that between the second inclined surface and the bottom surface. Lights from the first light source and the second light source enter the light guide plate from the first light incident surface and the second light incident surface, respectively. After entering the light guide plate, the lights can be reflected by the first inclined surface or the second inclined surface, or be refracted by the first inclined surface or the second inclined surface to the underlying reflector and reflected by the reflector back to the light guide plate from the first inclined surface or the second inclined surface. Based on such a structure, by controlling the on/off state of the first light source and the second light source, the viewing angle of the display device is switchable.

19 Claims, 4 Drawing Sheets

(56) References Cited

U.S. PATENT DOCUMENTS

| | | | |
|---|---|---|---|
| 8,068,187 B2 * | 11/2011 | Huizinga et al. | 349/15 |
| 8,182,131 B2 * | 5/2012 | Shim et al. | 362/625 |
| 8,425,103 B2 * | 4/2013 | Wang | 362/613 |
| 2003/0038590 A1 | 2/2003 | Silvernail et al. | |
| 2005/0269943 A1 | 12/2005 | Hack et al. | |
| 2006/0003474 A1 | 1/2006 | Tyan et al. | |
| 2006/0109396 A1 | 5/2006 | Tsai et al. | |
| 2007/0274099 A1 * | 11/2007 | Tai et al. | 362/610 |
| 2008/0238302 A1 | 10/2008 | Sung et al. | |
| 2009/0091667 A1 | 4/2009 | Schultz et al. | |
| 2011/0128757 A1 * | 6/2011 | Wang | 362/613 |

OTHER PUBLICATIONS

English translation of abstract of JP 2005141184A.
China Office Action dated Nov. 9, 2011.
Taiwan Office Action dated Jun. 27, 2013.

* cited by examiner

DISPLAY DEVICE WITH SWITCHABLE VIEWING ANGLE AND BACKLIGHT MODULE THEREOF

BACKGROUND OF THE INVENTION

1. Field of the Invention

The present invention relates to a display device with switchable viewing angle and a backlight module thereof. In particular, the present invention relates to a flat display device that carries out the switching of viewing angle electronically by the design of backlight module.

2. Description of the Prior Art

Comparing to traditional cathode ray tube displays (CRT displays), liquid crystal displays (LCDs) have advantages of thinner thickness, lighter weight, lower radiation etc., so that the LCDs take the place of traditional CRT displays and become the mainstream product in the display market as the LCDs are widely employed in all kinds of consumer electronic products.

The display device is one of the indispensable units for electronic devices, especially for notebook computers, personal digital assistants (PDAs), digital cameras, mobile phones, and other portable electronic devices. In order to facilitate the portability, the display devices accordingly shall have properties such as thin, light, and small. Portable electronic devices allow people to make phone calls, send messages and/or emails, edit documents, and perform other life/work activities at anytime and anywhere, so that people are not confined in particular places such as home or office equipped with corresponding electronic devices, increasing the usability and convenience of portable electronic devices in modern life.

However, since portable electronic devices have a high chance of being used in public or open spaces, privacy protection becomes an important issue. For display device, the anti-peeping function is provided to protect privacy. Available anti-peeping products on the market include anti-peeping films, anti-peeping screen protectors, or other anti-peeping devices that are additionally provided on the displays to achieve the anti-peeping effect. The anti-peeping films or other similar products are substantially a type of filter, which can minimize the light exit angle from the display screen. The anti-peeping film disposed on the display device can minimize the viewing angle to provide the anti-peeing function, achieving the effect of privacy protection.

However, the anti-peeping film or other anti-peeping devices is additionally disposed on the screen manually. When not in use, the user also has to remove the anti-peeping film manually. When the attachment and detachment of the anti-peeping film are performed frequently, it is significantly inconvenient to the user. In addition, the price of the anti-peeping film is expensive and need to be preserved carefully if removing from the display device.

SUMMARY OF THE INVENTION

It is an object of the present invention to provide a display device with switchable viewing angle and a backlight module thereof. In comparison with prior arts, the display device of the present invention does not require extra anti-peeping devices and has the function of electronically switching the viewing angle.

The display device includes a backlight module and a display panel. The backlight module includes a light guide plate, a plurality of first optical structures, a reflector, a first light source, and a second light source. The light guide plate has a bottom surface, a light exit surface, a first light incident surface, and a second light incident surface, wherein the bottom surface and the light exit surface are two opposite surfaces of the light guide plate. The display panel is disposed on the light exit surface. The first light incident surface and the second light incident surface are disposed at two opposite ends of the bottom surface. The first optical structures are formed abreast with each other on the bottom surface and extend along the first light incident surface. Each of the first optical structures includes a first inclined surface and a second inclined surface, wherein the first inclined surface and the second inclined surface respectively correspond to the first light incident surface and the second light incident surface and are connected to each other at an angle. A first angle between the first inclined surface and the bottom surface is smaller than a second angle between the second inclined surface and the bottom surface. The reflector is disposed on the bottom surface side. The first light source and the second light source are disposed along the first light incident surface and the second light incident surface, respectively. Lights emitted from the first light source and the second light source respectively enter into the light guide plate from the first light incident surface and the second light incident surface, then are reflected by the first inclined surface or the second inclined surface, or are refracted by the first inclined surface or the second inclined surface to the reflector and reflected by the reflector back to the light guide plate from the first inclined surface or the second inclined surface. The present invention utilizes the design that the first inclined surface and the second inclined surface have different angles with the bottom surface, i.e. the first angle is different from the second angle, as well as the reflection effect of the reflector, so that the display device can have different viewing angles (e.g. wider or narrower). By controlling the on/off state of the first light source and the second light source, the viewing angle of the display device is switchable.

DETAILED DESCRIPTION OF THE PREFERRED EMBODIMENT

A display device with switchable viewing angle and a backlight module thereof are provided. In the preferred embodiment, the display device is a flat display having the backlight module, such as liquid crystal display. However, in other embodiments of the present invention, the display device can be other types of display. The backlight module of the present invention may be also used in other devices in need of backlight module.

Figure 1A:
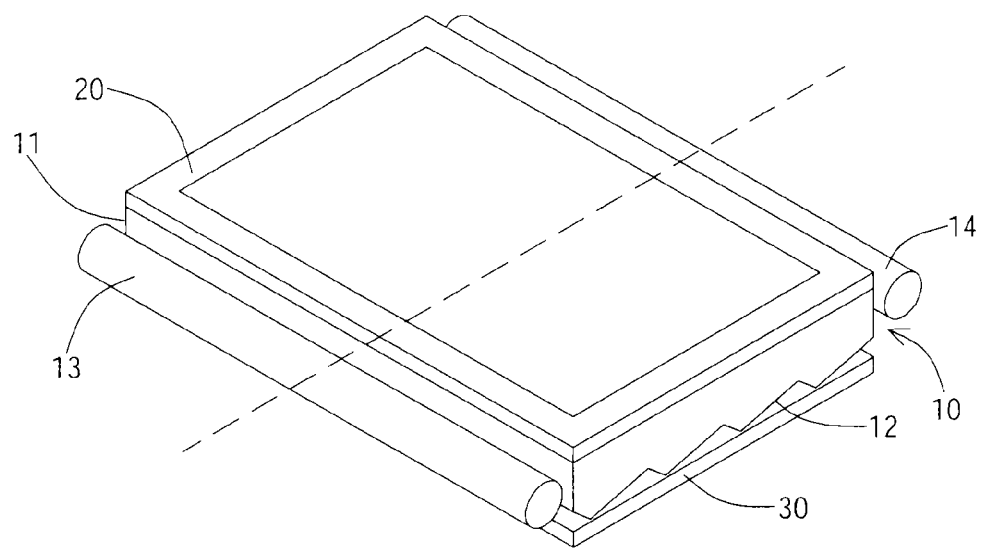
FIG. 1A is a schematic view of an embodiment of the display device with switchable viewing angle.
Figure 1B:
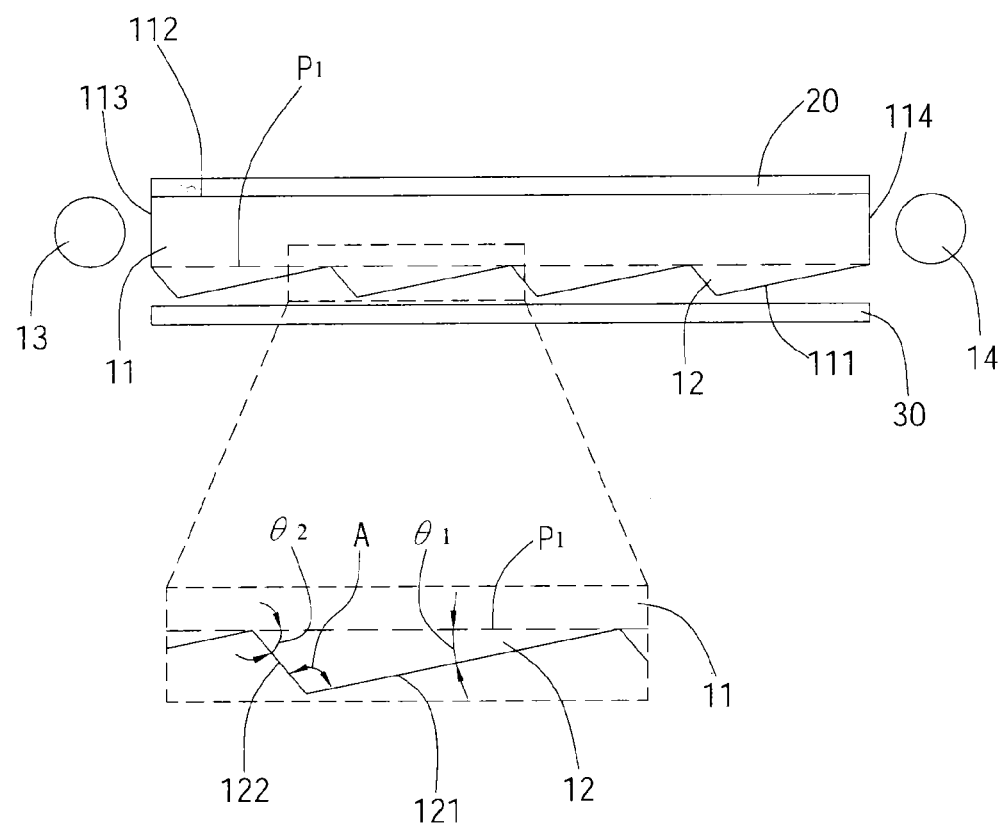
FIG. 1B is a cross-sectional view of FIG. 1A.

FIG. 1A is a schematic view of an embodiment of the display device with switchable viewing angle. FIG. 1B is a cross-sectional view of FIG. 1A. As shown in FIG. 1A and FIG. 1B, the display device includes a backlight module 10, a display panel 20, and a reflector 30. The backlight module 10 includes a light guide plate 11, a plurality of first optical structures 12, a first light source 13, and a second light source 14. The light guide plate 11 includes a bottom surface 111, a light exit surface 112, a first light incident surface 113, and a second light incident surface 114, wherein the bottom surface 111 and the light exit surface 112 are surfaces on two opposite sides of the light guide plate 11. The display panel 20 is disposed on the light exit surface 112, and the reflector 30 is disposed on the bottom surface side, i.e. underneath the bottom surface 111 in this embodiment. Moreover, the first light incident surface 113 and the second light incident surface 114 are disposed at two opposite ends of the bottom surface 111 (or the light exit surface 112), respectively.

The first optical structures 12 are formed abreast with each other on the bottom surface 111 and extend along the first light incident surface 113 (or along the second light incident surface 114), so that each of the first optical structures is parallel to the first light incident surface 113 (or the second light incident surface 114). Each of the first optical structures 12 includes a first inclined surface 121 and a second inclined surface 122 connected to each other at an angle A, so that the first inclined surface 121 and the second inclined surface 122 has a triangular cross-section. For each first optical structure 12, the first inclined surface 121 is farther away from the first light incident surface 113 than the second inclined surface 122 is, and the second inclined surface 122 is farther away from the second light incident surface 114 than the first inclined surface 121 is. The inward-pointing normal to the first inclined surface 121 of the first optical structure 12 is inclined toward the first light incident surface 113, so that the first inclined surface 121 is disposed corresponding to the first light incident surface 113, i.e. the first inclined surface 121 corresponds to the first light incident surface 113 at an angle. In other words, inside the light guide plate 11, the first inclined surface 121 is disposed to face the first light incident surface 113. Moreover, the inward-pointing normal to the second inclined surface 122 of the first optical structure 12 is inclined toward the second light incident surface 114, so that the second inclined surface 122 is disposed corresponding to the second light incident surface 114, i.e. the second inclined surface 122 corresponds to the second light incident surface 114 at an angle. In other words, inside the light guide plate 11, the second inclined surface 122 is disposed to face the second light incident surface 114. The first angle $\theta_1$ between the first inclined surface 121 and the plane $P_1$ is smaller than the second angle $\theta_2$ between the second inclined surface 122 and the plane $P_1$, wherein the plane $P_1$ represents the bottom surface 111 that serves as the bottom of the triangular cross section formed by the first inclined surface 121 and the second inclined surface 122. In a preferred embodiment, the first angle $\theta_1$ ranges between 0.1 degrees and 0.6 degrees, and the second angle $\theta_2$ ranges between 41.9 degrees and 46.4 degrees. However, in other embodiments, the angles $\theta_1$ and $\theta_2$ can have other degrees of angle and are not limit to the ranges described above.

In the embodiment shown in FIG. 1A and FIG. 1B, the first light source 13 is disposed along the first light incident surface 113 and the second light source 14 is disposed along the second light incident surface 114, so that the first light source 13 and the second light source 14 are disposed in parallel and separated by the light guide plate 11. Inside the light guide plate 11, the first inclined surface 121 is disposed corresponding to the first light incident surface 113 and different from the disposition of the second inclined surface 122 that is disposed opposite to the first light incident surface 113. Moreover, the second inclined surface 122 is disposed corresponding to the second light incident surface 114 and different from the disposition of the first inclined surface 121 that is disposed opposite to the second light incident surface 114. Therefore, lights generated from the first light source 13 and the second light source 14 can be reflected from the first inclined surface 121 and the second inclined surface 122 to the light exit surface 112, or refracted by the first inclined surface 121 and the second inclined surface 122 to exit the light guide plate 11 that are then reflected by the reflector 30 back to the light guide plate 11 from the first inclined surface 121 and the second inclined surface 122. In this embodiment, the first light source 13 and the second light source 14 may be light bars consisting of light emitting diodes (LEDs) or cold cathode fluorescent lamps (CCFLs). However, in other embodiment, other types of light sources are also applicable.

With the design of the first inclined surface 121 and the second inclined surface 122, after lights of the first light source 13 and the second light source 14 are reflected by the reflector 30 to the light guide plate 11, lights exit from the light exit surface 112 will show different light patterns. In particular, the difference between the first angle $\theta_1$ and the second angle $\theta_2$ allows lights, which are reflected from the first inclined surface 121 and the second inclined surface 122, or refracted by the first inclined surface 121 and the second inclined surface 122 to exit the light guide plate 11 from the first inclined surface 121 and the second inclined surface 122 and then reflected by the reflector 30 back to the light guide plate 11 from the first inclined surface 121 and the second inclined surface 122, to exit the light guide plate 11 in different angles and enable the display panel 20 to show different viewing angles after passing through the display panel 20. The angles $\theta_1$ and $\theta_2$ may be adjusted to meet different requirements for changing the exit angle of lights from the light guide plate 11.

Figure 2A:
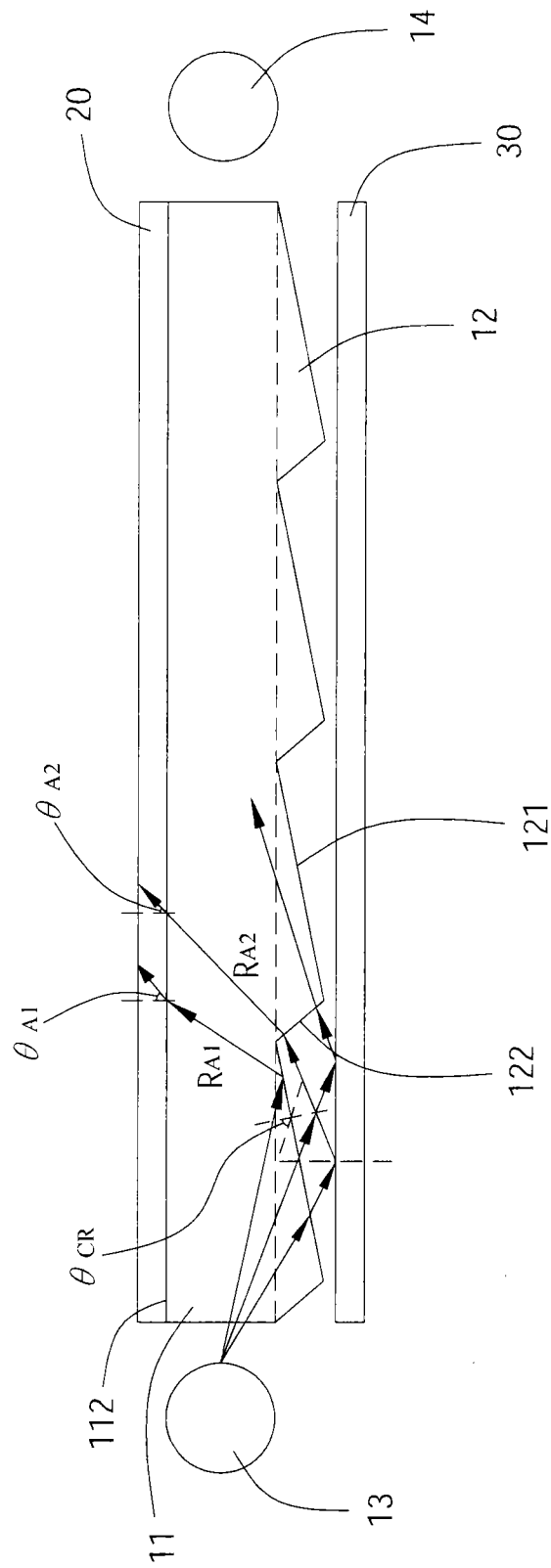
FIG. 2A is a schematic view of optical behavior of the first light source of FIG. 1B.
Figure 2B:
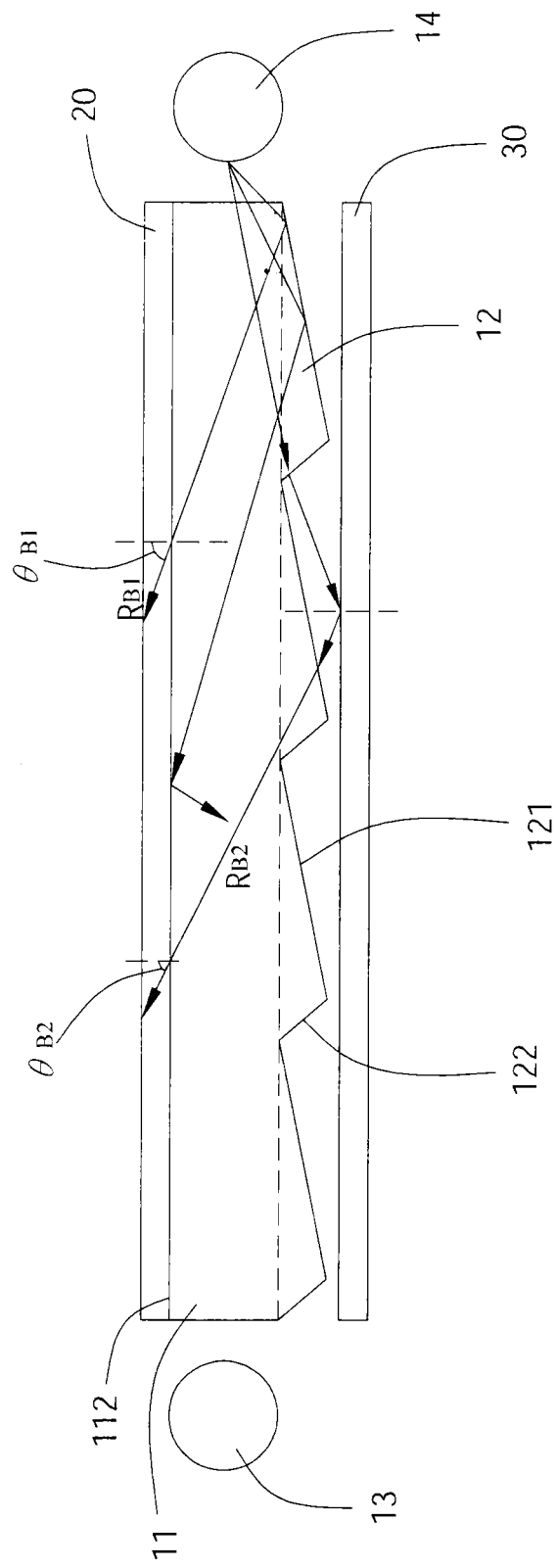
FIG. 2B is a schematic view of optical behavior of the second light source of FIG. 1B.

FIG. 2A is a schematic view of optical behavior of the first light source of FIG. 1B and FIG. 2B is a schematic view of optical behavior of the second light source of FIG. 1B. As shown in FIG. 2A and FIG. 2B, inside the light guide plate 11, when the incident angle of light on the edge of the light guide plate 11 is larger than the critical angle $\theta_{CR}$, the light will be reflected, otherwise the light will be refracted and exit the light guide plate 11. In the embodiment shown in FIG. 2A and FIG. 2B, the light $R_{A1}$ from the first light source 13 is reflected by the first light incident surface 121 to exit the light guide plate 11 at an angle $\theta_{A1}$ and then enter the display panel 20. The light $R_{A2}$ from the first light source 13 is refracted by the first light incident surface 121 to exit the light guide plate 11, is then reflected by the reflector 30 back to the light guide plate 11 to exit the light guide plate 11 at an angle $\theta_{A2}$ and enter the display panel 20. The light $R_{B1}$ from the second light source 14 is reflected by the first light incident surface 121, exits the light guide plate 11 at an angle $\theta_{B1}$, and enters the display panel 20. The light $R_{B2}$ from the second light source 14 is refracted by the second light incident surface 122 to exit the light guide plate 11, then is reflected by the reflector 30 back to the light guide plate 11, exits the light guide plate 11 at an angle $\theta_{B2}$, and enters the display panel 20. Because the exit angle $\theta_{A1}/\theta_{A2}$ of the light $R_{A1}/R_{A2}$ is smaller than the exit angle $\theta_{B1}/\theta_{B2}$ of the light $R_{B1}/R_{B2}$, the viewing angle of the display device 20 provided by the light $R_{A1}/R_{A2}$ from the first light source 13 is smaller than the viewing angle of the display device 20 provided by the light $R_{B1}/R_{B2}$ from the second light source 14. The angle $\theta_{A1}/\theta_{A2}$ is preferably a smaller angle capable of achieving the anti-peeping effect.

Based on the design mentioned above, by controlling the on/off state of the first light source 13 and the second light source 14, the viewing angle can be switched. That is, the function of switching the viewing angle is provided by controlling the activation or deactivation of the first light source 13 and the second light source 14. In this embodiment, the backlight module 10 can be operated at a first mode $M_1$, a second mode $M_2$, and a third mode $M_3$. The first light source 13 is activated when the backlight module 10 is operated at the first mode $M_1$. That is, the first light source 13 is turned on and the second light source 14 is turned off at the first mode $M_1$. The second light source 14 is activated when the backlight module 10 is operated at the second mode $M_2$. That is, the second light source 14 is turned on and the first light source 13 is turned off at the second mode $M_2$. The first light source 13 and the second light source 14 are both activated when the backlight module 10 is operated at the third mode $M_3$. That is, the first light source 13 and the second light source 14 are both turned on at the third mode $M_3$.

As mentioned above, because the viewing angle provided by lights from the first light source 13 is smaller than the viewing angle provided by lights from the second light source 14, when the backlight module 10 is operated at the first mode $M_1$, the light pattern has a narrower viewing angle, so that the first mode $M_1$ can be used for anti-peeping. When the backlight module 10 is operated at the second mode $M_2$, the light pattern has a wider viewing angle, so that the second mode $M_2$ can be used as normal mode. Besides, since lights from the first light source 13 provide a narrower viewing angle, when the first light source 13 and the second light source 14 generate lights of same energy, lights from the first light source 13 are more concentrated, so that the backlight module 10 operated at the first mode $M_1$ will have higher brightness than at the second mode $M_2$. In a preferred embodiment, the brightness of the first light source 13 can be decreased, for example to a level lower than the brightness of the second light source 14, to avoid inconsistency of the brightness when the backlight module 10 is operated at the first mode $M_1$ or at the second mode $M_2$. When the backlight module 10 is operated at the third mode $M_3$, the light energy at the third mode $M_3$ is larger than the light energy at the first mode $M_1$ or the second mode $M_2$, and the display device 20 correspondingly has a relatively higher brightness, so that the third mode $M_3$ can serve as high brightness mode.

The operation of switching among different modes can preferably utilize the switch button provided on the display device or the keyboard connected to the computer that is connected to the display device. In such a case, corresponding circuits are required to control the on/off state of the first light source 13 and the second light source 14. Other software or hardware devices can also be considered and cooperated if necessary. In comparison with the prior art, the display device of the present invention utilizes the design of the light guide plate 11 to provide different exit angles of light, so that the display device 20 can provide two different viewing angles, i.e. wider or narrower. As such, by providing different viewing angles, the display device of the present invention can achieve the anti-peeping effect without using additional anti-peeping device. However, in other embodiments, the display device of the present invention can also adopt other optical films to further enhance the anti-peeping effect. Moreover, the display device of the present invention can carry out the switching of viewing angle electronically due to the configuration of the backlight module.

Figure 3:
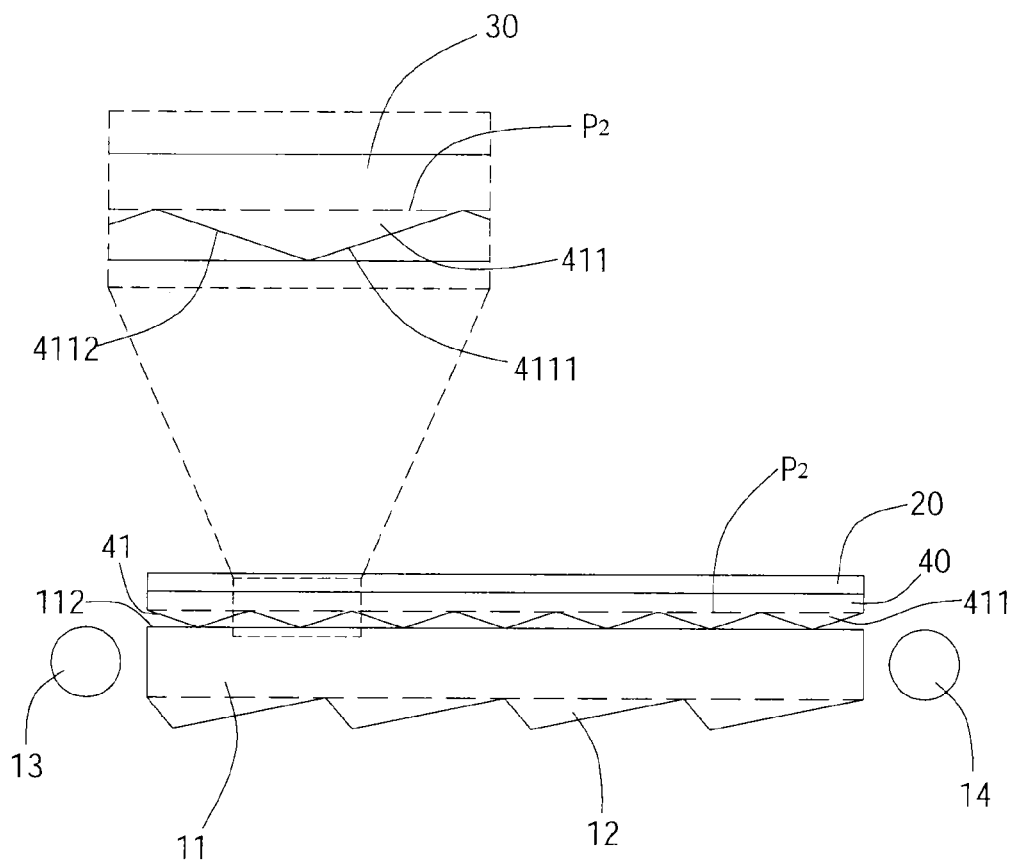
FIG. 3 is a schematic view of another embodiment of the display device with switchable viewing angle.

FIG. 3 is a schematic view of another embodiment of the display device with switchable viewing angle. As shown in FIG. 3, in comparison with the foregoing embodiment, an optical film 40 is disposed between the light guide plate 11 and the display panel 20. On the surface 41 of the optical film 40, a plurality of second optical structures 411 are disposed abreast with each other and parallel to the first optical structures 12 of the light guide plate 11. Each of the second optical structures includes a third inclined surface 4111 and a fourth inclined surface 4112 connected to each other at an angle, wherein the angle between the third inclined surface 4111 and the plane $P_2$ is equal to the angle between the fourth inclined surface 4112 and the plane $P_2$, so that the third inclined surface 4111, the fourth inclined surface 4112, and the plane $P_2$ together form a cross section in the form of isosceles triangle, wherein the plane $P_2$ represents the surface 41 that serves as the bottom of the triangular cross section formed by the third inclined surface 4111 and the fourth inclined surface 4112. That is, each of the second optical structures 411 has two congruent sides in a symmetrical form. Such a symmetrical structure can maintain the ratio of light exit angle when the backlight module 10 is operated at the first mode $M_1$ and at the second mode $M_2$, so that the optical film 40 will not interfere with the viewing angle of the backlight module 10 operated at the first mode $M_1$ or at the second mode $M_2$. The optical film 40 can be brightness enhancement film (BEF), diffuser or other optical films.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A backlight module, comprising:
a light guide plate comprising a bottom surface, a first light incident surface, and a second light incident surface, wherein the first light incident surface and the second light incident surface are disposed at two opposite ends of the bottom surface;
a plurality of first optical structures, formed on the bottom surface, extending along the first light incident surface, each of the first optical structures including a first inclined surface and a second inclined surface, wherein the first inclined surface and the second inclined surface respectively correspond to the first light incident surface and the second light incident surface and are connected to each other at an angle, a first angle between the first inclined surface and the bottom surface is smaller than a second angle between the second inclined surface and the bottom surface;
a reflector disposed on the bottom surface;
a first light source disposed along the first light incident surface
a second light source disposed along the second light incident surface; and
at least one optical film, wherein the light guide plate comprises a light exit surface opposite to the bottom surface, the optical film is disposed on the light exit surface, and on a surface of the optical film, a plurality of second optical structures are disposed abreast with each other and parallel to the first optical structures of the light guide plate,
wherein lights emitted from the first light source and the second light source respectively enter into the light guide plate from the first light incident surface and the second light incident surface, then are refracted by the first inclined surface and the second inclined surface to the reflector and reflected by the reflector back to the light guide plate from the first inclined surface or the second inclined surface.
2. The backlight module of claim 1, wherein the backlight module is capable of being operated at a first mode or a second mode, the first light source is activated when the backlight module is operated at the first mode, the second light source is activated when the backlight module is operated at the second mode.

3. The backlight module of claim 2, wherein a viewing angle of the backlight module operated at the first mode is smaller than a viewing angle of the backlight module operated at the second mode.

4. The backlight module of claim 2, wherein the backlight module is further capable of being operated at a third mode, the first light source and the second light source are both activated when the backlight module is operated at the third mode.

5. The backlight module of claim 4, wherein a brightness of the backlight module operated at the third mode is greater than a brightness of the backlight module operated at the first mode or the second mode.

6. The backlight module of claim 1, wherein the first angle between the first inclined surface and the bottom surface substantially ranges between 0.1 degrees and 0.6 degrees.

7. The backlight module of claim 1, wherein the second angle between the second inclined surface and the bottom surface substantially ranges between 41.9 degrees and 46.4 degrees.

8. The backlight module of claim 1, wherein a brightness of the first light source is lower than a brightness of the second light source.

9. The backlight module of claim 1, wherein each of the second optical structures of the optical film comprises a third inclined surface and a fourth inclined surface, a third angle between the third inclined surface and the surface is equal to a fourth angle between the fourth inclined surface and the surface.

10. The backlight module of claim 1, wherein the first inclined surface is farther away from the first light incident surface than the second inclined surface is.

11. A display device, comprising:
  a light guide plate comprising a bottom surface, a light exit surface, a first light incident surface, and a second light incident surface, wherein the bottom surface and the light exit surface are two opposite surfaces of the light guide plate, the first light incident surface and the second light incident surface are disposed at two opposite ends between the bottom surface and the light exit surface, respectively;
  a plurality of first optical structures, formed on the bottom surface, extending along the first light incident surface, each of the first optical structures including a first inclined surface and a second inclined surface, wherein the first inclined surface and the second inclined surface respectively correspond to the first light incident surface and the second light incident surface and are connected at an angle, a first angle between the first inclined surface and the bottom surface is smaller than a second angle between the second inclined surface and the bottom surface;
  a reflector disposed on the bottom surface;
  a display panel disposed on the light exit surface;
  a first light source disposed along the first light incident surface
  a second light source disposed along the second light incident surface; and
  at least one optical film, wherein the light guide plate comprises a light exit surface opposite to the bottom surface, the optical film is disposed on the light exit surface, and on a surface of the optical film, a plurality of second optical structures are disposed abreast with each other and parallel to the first optical structures of the light guide plate,
  wherein lights of the first light source and the second light source exit the light guide plate from the first inclined surface and the second inclined surface and are then reflected by the reflector back to the light guide plate from the first inclined surface or the second inclined surface.

12. The display device of claim 11, wherein the display device is capable of being operated at a first mode or a second mode, the first light source is activated when the backlight module is operated at the first mode, the second light source is activated when the backlight module is operated at the second mode.

13. The display device of claim 12, wherein a viewing angle of the display device operated at the first mode is smaller than a viewing angle of the display device operated at the second mode.

14. The display device of claim 12, wherein the display device is further capable of being operated at a third mode, the first light source and the second light source are both activated when the display device is operated at the third mode.

15. The display device of claim 14, wherein a brightness of the display device operated at the third mode is greater than a brightness of the display device operated at the first mode or the second mode.

16. The display device of claim 11, wherein the first angle between the first inclined surface and the bottom surface substantially ranges between 0.1 degrees and 0.6 degrees.

17. The display device of claim 11, wherein the second angle between the second inclined surface and the bottom surface substantially ranges between 41.9 degrees and 46.4 degrees.

18. The display device of claim 11, wherein a brightness of the first light source is lower than a brightness of the second light source.

19. The display device of claim 11, wherein the first inclined surface is farther away from the first light incident surface than the second inclined surface is.

* * * * *